July 10, 1956 L. PENSAK 2,754,357

COLOR TELEVISION IMAGE REPRODUCING SYSTEMS

Filed March 3, 1950 3 Sheets-Sheet 1

INVENTOR
Louis Pensak
BY [signature]
ATTORNEY

INVENTOR
Louis Pensak
BY Olin C. Mitchell
ATTORNEY

COLOR TELEVISION IMAGE REPRODUCING SYSTEMS

Filed March 3, 1950 3 Sheets-Sheet 3

INVENTOR
Louis Pensak
BY [signature]
ATTORNEY

United States Patent Office 2,754,357

Patented July 10, 1956

2,754,357

COLOR TELEVISION IMAGE REPRODUCING SYSTEMS

Louis Pensak, Princeton, N. J., assignor to Radio Corporation of America, a corporation of Delaware Application March 3, 1950, Serial No. 147,494

31 Claims. (Cl. 178—5.4)

This invention relates to color television systems and particularly to systems of this character employing a single image reproducing tube.

Most of the color television systems which previously have been devised employ either a separate image reproducing tube for each of the component colors of the image to be reproduced or a single image reproducing tube in conjunction with which there generally is provided a color filter device. Those systems employing a plurality of image reproducing tubes respectively for the component colors of the image to be reproduced are susceptible of use for the translation of video signals transmitted and received either simultaneously over individual channels or in a predetermined sequence over a single communication channel. Heretofore, those systems employing a single tube have been particularly well adapted for use in translating video signals occurring in sequence. Most of such latter systems, however, are not suitable for the translation of simultaneously occurring video signals representing the component colors of the image to be reproduced.

There have been proposed, nevertheless, color television image reproducing systems embodying a single image reproducing tube for use in conjunction with successively received video signals representing respectively the different component colors of the image to be reproduced. In those systems of this character wherein the image reproducing tube is provided with a single electron beam for controlling the excitation of the luminescent screen, the images which are reproduced are somewhat deficient in light intensity or brilliance. The reason for this is that, in such prior art systems, the single electron beam is required to control the excitation of different successive areas of the luminescent screen. One manner in which this result is obtained is by deflecting the beam to successive sub-elemental areas of the luminescent screen. It is apparent, therefore, that the different areas of the luminescent screen are excited for very brief intervals of time. In other words, the duty cycle of the device is considerably shorter than in a conventionally operated monochrome television image reproducing system, for example.

In order to overcome to some extent this deficiency of the prior art single tube color television image reproducing systems, it has been proposed to provide the image reproducing tube with a plurality of electron beams, one for each of the component colors in which the image is to be reproduced. While such an arrangement increases the light intensity of the reproduced image, it also introduces problems of similarly deflecting all of the electron beams at the same time and also of effecting the required precise registration of the beams with the areas of the luminescent screen to be excited thereby.

A single image reproducing tube provided with a plurality of electron beams for controlling the excitation of the luminescent screen also has been proposed for use in the type of television system wherein the video signals representing respectively the component colors of the image to be reproduced are transmitted and received simultaneously over individual communication channels. Here again, by reason of the employment of three electron beams, the light level of the reproduced image is satisfactory. However, the deflection and registration problems still exist.

It, therefore, is an object of this invention to provide an improved color television system embodying a single image reproducing tube of such a character that it may be satisfactorily employed in any of the presently existing television signalling systems.

Another object of the invention is to provide an improved color television system which will enable the reproduction of an image in its component colors at a relatively high light level by means of a single image reproducing tube which is relatively free from electron beam deflection and registration problems.

Still another object of the invention is to provide an improved image reproducing tube by which an image may be reproduced in its component colors and which is susceptible of use in any of the presently existing color television signalling systems.

A further object of the invention is to provide an improved image reproducing tube capable of reproducing an image in its component colors and which utilizes the available electron scanning beam energy at a relatively high efficiency.

A still further object of the invention is to provide an improved image reproducing tube capable of reproducing an image in its component colors and which embodies a novel color-selecting electron control electrode by means of which to selectively excite different areas of the luminescent screen.

Still another object of the invention is to provide an improved process of forming a color-selecting electron control electrode capable of selectively exciting different areas of the luminescent screen of an image reproducing tube.

In accordance with this invention, there is provided an improved additive color television image reproducing system, wherein the component colors, when combined, produce substantially white light. The present system includes a cathode ray image reproducing tube, such as a color-kinescope, having a luminescent screen consisting of a multiplicity of phosphor areas capable respectively of emitting differently colored light when electronically excited. The color-kinescope also is provided with a screen excitation control electrode of novel construction which may be operated in conjunction with a primary electron scanning beam to selectively excite the screen. The electron excitation of the screen is effected under the control of received video signals representing the component colors of the image to be reproduced. The screen excitation is produced by secondary electrons emitted under the control of the primary scanning beam. Such a system including a tube of this character may be used in any of the better known color television signal transmission systems. One well-known signal transmission system is that in which the video signals representing the component image colors are simultaneously transmitted over a plurality of individual signalling channels. Another signal transmission system is one in which the video signals are transmitted in successive groups representing the color components of the image in complete horizontal lines, fields or frames. Still another system is that in which the color representative video signals are transmitted according to the so-called dot or elemental multiplex principle. In some forms of the present invention the primary scanning beam is unmodulated and the excitation of the luminescent screen areas is selectively effected by the electron control electrode in correspondence with the received video signals. In other forms of the invention the primary scanning beam is modulated by the video signals, in which case, the electron control electrode is energized in such a manner that it functions substantially as an electron gate.

In accordance with one of the features of the invention, the color-selecting electron control electrode of the cathode ray tube consists of an electron emitter and a grid structure or network for selectively controlling the electron current to the luminescent screen areas. This electrode is provided with an individual grid element for each of the phosphor areas of the screen and each grid element is mounted adjacent to an electron emitting area. In a preferred embodiment of the invention, the screen-exciting electron emission is a secondary one produced under the control of a primary electron beam.

One illustrative embodiment of a color-selecting electron control electrode in accordance with the invention which is presently preferred consists of a thin, metallic sheet mounted in spaced, substantially parallel relationship to the luminescent screen. This sheet is of an electrode type generally known as a dynode in that it is capable of emitting secondary electrons from the surface thereof facing the screen when the opposite surface thereof is impinged by a primary electron beam. The screen-facing surface of the metallic sheet is provided with a multiplicity of spaced insulating projections or protuberances having configurations similar to those of the phosphor screen areas. These projections may be in the form of elongated ribs in the case where the phosphor areas of the luminescent screen are elongated strips. The spaces between adjacent ribs of the color-selecting electrode are in substantial register respectively with the phosphor screen strips so that the secondary electrons emitted from the exposed screen-facing surfaces of the metallic sheet may be directed toward the respective phosphor strips. In order to control the intensity as well as the direction of the secondary electrons emitted by the metallic sheet, the insulating ribs are provided with metallic strips or ribbons on the lateral faces thereof so that, when suitably energized, they form an electron-optical system for focussing the secondary electrons upon the registering phosphor strips and also serve to control the intensity of the secondary electrons for excitation of the luminescent screen areas.

In accordance with still another feature of the invention, there is provided a novel process or method of forming a color-selecting electrode of the character described. This process comprises the formation, from a master plate, of a metallic complementary sub-master sheet having ridges corresponding in dimensions to the desired spaces between the ribs of the color-selecting electrode to be reproduced and slots between the sub-master ridges corresponding substantially to the dimensions of the insulating ribs of the electrode to be formed. The sides only of the sub-master sheet ridges are plated with a metal of a different character from that of which the sub-master plate is formed. The slots between the plated ridges of the sub-master sheet are filled with insulating material and the tops of the sub-master sheet ridges, together with the ends of the insulating strips, are joined by a wire mesh preferably of the same metal with which the ridges are plated. The sub-master plate then is removed by etching, for example, so that there is left only the insulating ribs having the metallic ribbons plated on the sides thereof joined together by the wire mesh. There is then deposited upon the wire mesh a thin metallic sheet having the property of emitting secondary electrons from one surface thereof when the other surface is bombarded by a primary electron beam.

The novel features that are considered characteristic of this invention are set forth with particularity in the appended claims. The invention itself, however, both as to its organization and method of operation as well as additional objects and advantages thereof will best be understood from the following description taken in connection with the accompanying drawings, in which:

Figures 2, 5:
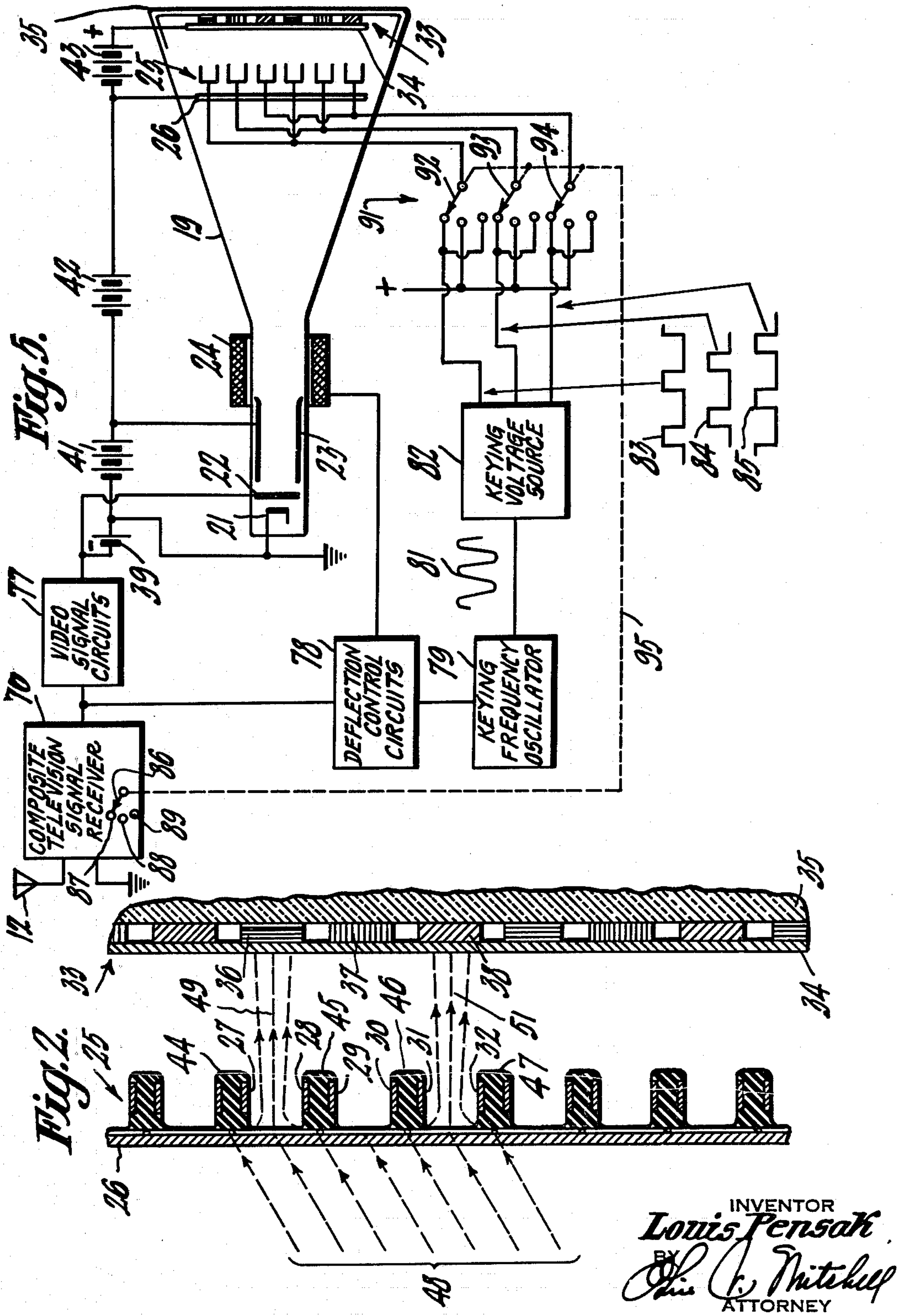
Figure 2 is a fragmentary view to an enlarged scale of the luminescent screen and color-selecting electrode of the cathode ray tube embodying the invention.
Figure 4:
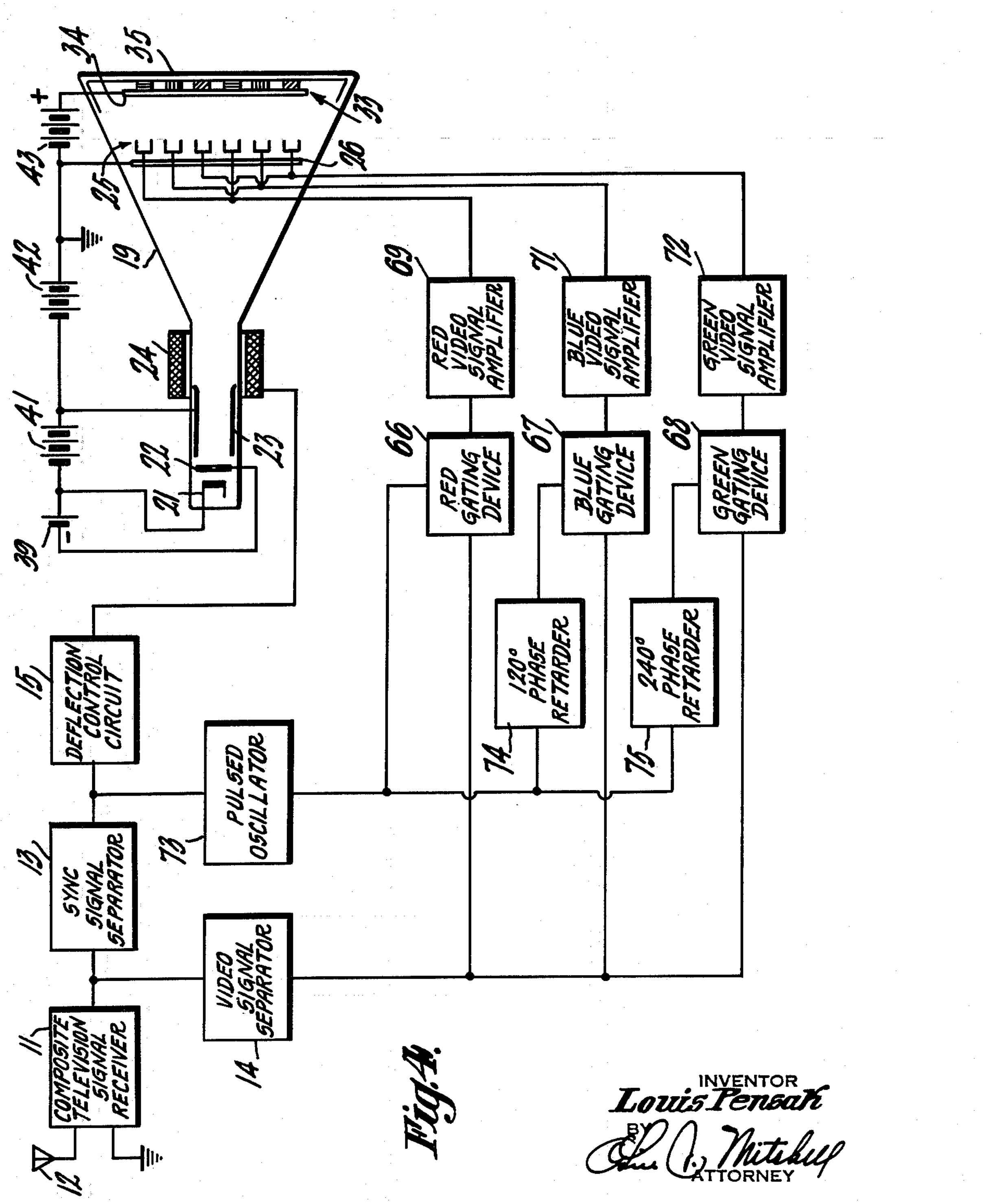

Figures 3A to 3J inclusive illustrate the successive steps of the process by means of which the novel color-selecting electrode embodying the invention may be formed;

Figure 4 is a block circuit diagram of another embodiment of a color television reproducing system in accordance with the invention which is particularly adapted for use in a television signal transmission system operating in accordance with the dot or elemental multiplex principle; and, Figure 5 is another block circuit diagram of a color television image reproducing system in accordance with the invention showing one manner in which it may be used in a television signalling system operating according to the line or field sequential principle and further illustrating one manner in which the present invention may be employed to reproduce images either in color or in black and white.

Reference now will be made particularly to Figure 1 of the drawings for a more complete description of the invention. The television signal receiving and reproducing system shown in this figure includes a composite television signal receiver 11 coupled to a suitable antenna 12. It will be understood that the receiver 11 may include one or more stages of radio frequency signal amplification, a first detector or frequency converter, one or more stages of intermediate frequency amplification and a second or signal detector so as to produce in the output circuit of the receiver a composite television signal comprising video signal components and system control components such as the horizontal and vertical synchronizing pulses. For the purpose of illustration of this form of the invention, it is assumed that the television signalling system operates in accordance with the simultaneous principle such as disclosed in United States Patent 2,335,180, granted November 23, 1943, to A. N. Goldsmith and entitled "Television System." It also may be assumed that the image is to be reproduced in three component colors such as red, blue and green, for example. Accordingly, the video signals representing the respective component colors of the image are transmitted and received over three different channels, such as carrier waves of three different preferably adjacent frequencies. It will be understood that the three different trains of video signals may be simultaneously received by the receiver 11 and, subsequently, conveyed through separate circuits for energization of the image reproducing device. The details of such circuits are disclosed in the Goldsmith patent referred to; and, since they form no part of the present invention, they are not reproduced here in order to simplify as much as possible the present disclosure.

The composite television signals derived from the output circuit of the receiver 11 are impressed upon a synchronizing signal separator 13 and also upon a video signal separator 14. Thus, there are produced in the output circuit of the synchronizing signal separator only the horizontal and vertical synchronizing pulses and in the output circuit of the video signal separator only the video signals representing the three component color content of the image to be reproduced. The synchronizing signal separator 13 is coupled to deflection control circuits 15 from which there is derived energy of suitable frequency and waveform to control the deflection of an electron beam in a conventional manner. The output circuit of the video signal separator 14 is coupled to apparatus designated as a red video signal channel 16, a blue video signal channel 17 and a green video signal channel 18. It will be understood that these signalling channels include suitable apparatus to effect the desired segregation of the video signals representing respectively the different component colors of the image to be reproduced together with the necessary amplifying apparatus as disclosed in the referenced Goldsmith patent.

The image reproducing system also includes an image reproducing device such as a cathode ray tube or color-kinescope 19. This tube is provided with the usual means for developing and deflecting an electron beam over a target electrode. This apparatus includes an electron emitting cathode 21, an electron intensity control electrode such as a grid 22 and a beam forming and focussing and accelerating electrode system represented generally by the substantially cylindrical electrode 23. Deflection of the electron beam is effected by means including an electromagnetic yoke 24. The cathode ray tube also includes a target electrode for the electron beam in the form of a color selecting electrode 25 which serves as the source for electrons by which to excite the luminescent screen of the tube and also as a control electrode for the exciting electrons. This electrode structure includes a planar electrode or metallic sheet 26 preferably of 0.1 to 0.2 micron thickness, which, when impinged on the reverse face or surface thereof adjacent to the electron gun by the primary electron beam, is capable of emitting secondary electrons from the obverse face or opposite surface thereof. It will be understood that the sheet 26 may be locally activated by means other than primary electrons, such as by thermal or photoelectric means, for example. The color-selecting electrode 25 also includes an electron control network in the form of longitudinal ribbons such as 27—28, 29—30 and 31—32 which are arranged in pairs and are laterally directed toward the screen 33 as indicated. The luminescent screen 33 with which the cathode ray tube 19 also is provided preferably is one having a thin transparent semi-conducting film or metal coating 34 so that the various phosphor light-emitting areas may be held at a desired potential. A cathode ray tube having a luminescent screen of this character is of the type described in an article appearing in the RCA Review, vol. VII of October 1946 at page 5 by D. W. Epstein and L. Pensak and entitled "Improved cathode ray tubes with metal-backed luminescent screens." Such a structure, which is presently preferred, has the additional advantage of reflecting forwardly the back-emitted light which otherwise would not be usefully employed. Alternatively, the semi-conducting film may be applied directly to the glass end wall 35 and the phosphors laid down on the back surface of the film.

The phosphor areas are laid down in elongated substantially horizontal strips of sub-elemental widths such as represented at 36, 37 and 38. These phosphor strips are formed in groups having no greater than elemental widths and each of which includes at least one strip capable of emitting light of each of the component colors in which the image is to be reproduced. For example, consider that the strip 36 is capable of emitting red light when excited by an electron beam; the strip 37 emits blue light; and the strip 38 emits green light. The phosphor strips of the luminescent screen are laid down in such a manner as to substantially register with the respective pairs of control elements. In a three-color system, in which the image reproducing tube 19 has a 16-inch diameter screen 33, the maximum width of each phosphor strip is approximately 1/150 of an inch. Similarly, the color-controlling ribbon pairs are approximately 150 to the inch in number.

The electrode system of the cathode ray tube 19 is suitably energized from a power supply in a manner shown schematically in this figure. In accordance with conventional practice, the control grid 22 is maintained at a slightly negative potential relative to the cathode 21 by means of a suitable source of voltage such as represented by the battery 39. Also, conventionally, a positive voltage relative to that of the cathode is impressed upon the electrode 23 by means such as represented by a battery 41. An even greater positive potential is impressed upon the metallic sheet 26 of the color-selecting electrode 25 by means such as represented by a battery 42. In view of the coupling of the electron control network of the color selecting electrode to the video signal channels 16, 17 and 18, it is preferable that the metallic sheet 26 serving as the source of secondary electrons be maintained substantially at ground or other convenient reference potential as indicated. Finally, in order to provide a suitable acceleration for the secondary electrons emitted by the sheet 26, there is impressed a still greater positive potential upon the metallic film 34 of the luminescent screen 33 by means such as represented by a battery 43.

The deflection yoke 24 is energized by a connection to the deflection control circuits 15 so as to effect the deflection of the primary electron beam over the surface of the metallic sheet 26 in a desired predetermined pattern. The different pairs of control ribbons such as 27 to 32 are suitably connected to the video signal channels 16, 17 and 18. All of the red light controlling pairs of ribbons such as 27 and 28 associated with phosphor strips such as 36 capable of emitting red light are connected together and to the red video signal channel 16. Similarly, the blue light controlling ribbon pairs such as 29 and 30 are connected together and to the blue video signal channel 17. In like manner, the green light controlling ribbon pairs such as 31 and 32 are connected to the green video signal channel 18.

Figure 1:
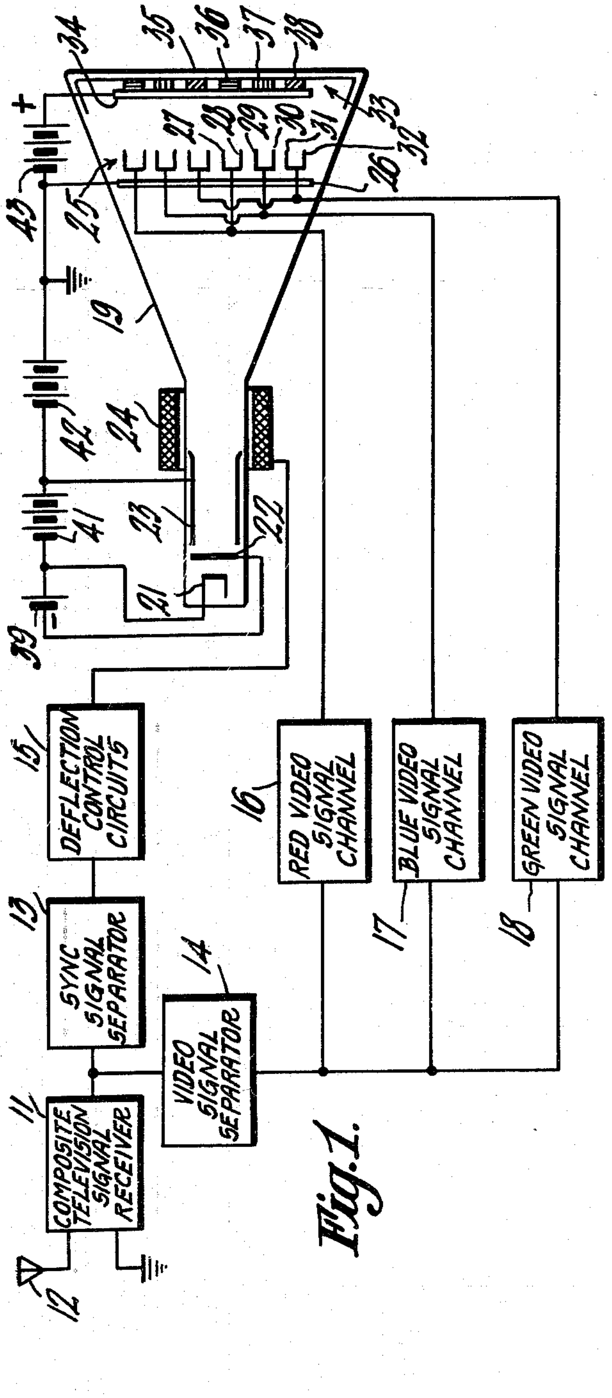
Figure 1 is a block circuit diagram of a color television image reproducing system embodying the invention wherein the color representative video signals are received simultaneously and in which the improved cathode ray tube is shown schematically.

It is considered that, before describing in detail the construction of the color-selecting electrode 25, the operation of the color television image reproducing system shown in Figure 1 may be understood from the following description. The electron beam developed in the cathode ray tube 19 is caused to scan the back surface of the electron-sensitive metallic sheet 26 in a conventional television scanning pattern. The intensity of the electron beam is maintained uniform. The beam is formed in such a manner that it has a suitable size or cross-sectional area in the plane of the metallic sheet 26 to encompass at least one group of three pairs of control ribbons such as 27—32 and this area should be no larger than an elemental area of the image to be reproduced. Consequently, on the front or screen-facing surface of the metallic sheet 26 there is effected a secondary electron emission from those portions of this surface exposed between the respective pairs of control ribbons and corresponding to the area of the back surface impinged by the primary electron beam. That portion of the secondary electron emission which is utilized to excite the phosphor strips such as 36, 37 and 38 is dependent upon the energization of the pairs of electron control ribbons such as 27—32. Assume that the particular elemental area of the image to be reproduced contains only red and green color components. This condition is represented by the video signals derived from the respective channels 16, 17 and 18. For example, the video signals derived from the red channel 16 are of such magnitude to represent the red signal content and are impressed upon the pair of control ribbons 27—28 in such polarity to effect the flow of secondary electrons toward the red light emitting phosphor strip 36. These secondary electrons are suitably energized by means of the potential impressed between the luminescent screen 33 and the color-selecting electrode 25 to excite the strip 36. Also, by reason of the particular configuration of the ribbons 27 and 28, there is produced an electron-optical effect which serves to focus the secondary electrons onto the phosphor strip 36. The electron-optical axis about which each pair of ribbons such as 27 and 28 is disposed and extending between the electrode 25 and the screen 33 intersect and screen substantially at right angle because of the described registration between the ribbon pairs and the respective phosphor screen strips. Thus, irrespective of the angle at which the primary electron beam strikes the electrode 25, the secondary electrons invariably impact the screen 33 at right angles.

Since there is assumed to be no blue color component in this elemental area of the image to be reproduced, the control voltage derived from the blue video signal channel 17 is of such magnitude and polarity to suitably bias the pair of control ribbons 29—30 to prevent the flow of secondary electrons to the blue light emitting phosphor strip 37.

In a similar manner the voltage derived from the green video signal channel 18 is of suitable magnitude and polarity to energize the control ribbon pair 31—32 to effect the flow of secondary electrons to the green light emitting phosphor strip 38 in such intensity to correspond with the received green video signal.

As successive elemental areas of the metallic sheet 26 are scanned by the unmodulated primary electron beam, other corresponding areas of the screen-facing surface of the sheet are caused to emit secondary electrons which are controlled by other pairs of color-selecting electrode ribbons to suitably excite the phosphor strips in register therewith in accordance with the received video signals.

Reference now will be made to Figure 2 for a more detailed description of the structural arrangement of a preferred form of color-selecting electrode. As previously indicated, this electrode 25 includes a thin metallic sheet 26 which is provided, on the surface thereof which faces the luminescent screen 33, with a plurality of ribs such as 44, 45, 46 and 47 of insulating material. The electron controlling elongated ribbons such as 27—32 are supported on the lateral faces of the insulating ribs substantially as shown. It will be noted that the respective ribbons of each pair such as 27 and 28 are formed on adjacent faces of two of the insulating ribs such as 44 and 45. The two ribbons of each pair may be suitably connected electrically at convenient points such as at the ribbon ends and also to corresponding pairs of ribbons in the other elemental areas of the electrode in the manner shown in Figure 1. It will be noted that the portions of the screen-facing surface of the metallic sheet 26 between adjacent insulating ribs such as 44 and 45 are in substantial register with the corresponding phosphor strips of the luminescent screen such as the strip 36.

In operation, an electron beam having a minimum relative size such as indicated at 48 is caused to impinge upon the back surface of the sheet 26, thereby causing the emission of secondary electrons from the oppositely disposed portions of the screen-facing surface of this sheet which are exposed between the insulating ribs. In the example assumed for the explanation of the operation of the image reproducing system of Figure 1, the elemental area of the image under consideration was supposed to contain only red and green component colors. The electron-controlling ribbon pairs are suitably biased to cause the impingement of the red light emitting phosphor strip 36 by secondary electrons such as represented at 49. Similarly, the secondary electron emission from the exposed portion of the metallic sheet 26 between the insulating ribs 46 and 47 is directed as indicated at 51 for excitation of the green light emitting phosphor strip 38. Even though the primary electron beam 48 impinges upon the back surface of the metallic sheet 26 in the region behind the area of the screen facing surface which is exposed between the insulating ribs 45 and 46, secondary electron emission from this exposed area is either prevented or at least is prevented from exciting the oppositely disposed blue light emitting phosphor strip 37 by means of the control voltage impressed upon the pair of ribbons 29 and 30.

As a source of secondary electrons the metallic sheet 26 behaves in a conventional manner in that, aside from the effect of the control grid network by which the electron excitation of the phosphor screen areas is controlled, the intensity of the secondary electron emission is dependent upon the intensity of the primary electron scanning beam 48 in accordance with the secondary electron emission ratio of the sheet 26. However, it will be understood that, in order to have available for excitation of the luminescent screen a sufficient quantity of secondary electrons, the intensity of the primary scanning beam 48 is maintained suitably high for this purpose. In view of the fact, however, that the intensity of the primary scanning beam in this embodiment of the invention is maintained substantially constant, it will be seen that, for purposes of the present consideration, the secondary electron excitation of the phosphor screen strips is primarily dependent upon the energizing voltages impressed upon the color-selecting electron ribbon pairs. It also will be noted that the electron excitation of the screen phosphor strips is entirely independent of the angle at which the primary scanning beam impinges the metallic sheet 26. In accordance with the usual practice, the angle at which this beam strikes the sheet 26 varies depending upon the location of the portion of the sheet being scanned. Conseqently, in all areas of the color-selecting electrode 25 the secondary electron emission and the control thereof for exciting the screen phosphor strips is independent of all characteristics of the primary scanning beam except its instantaneous position. This position determines the portion of the luminescent screen which is subject to excitation. It also will be noted that, by reason of the configuration of the metallic electron controlling ribbons, there is produced effectively an electron lens which functions to focus the secondary electrons directly upon the corresponding phosphor strip. Therefore, the registration of the scanning beam 48 and the particular phosphor areas of the luminescent screen 33 are entirely independent. This registration may be determined for all operations of the tube by properly orienting the color-selecting electrode 25 relative to the luminescent screen 33. Thereafter, the registration is not subject to change by reason of the particular operation of the device.

Figures 3A, 3B, 3C, 3D, 3E, 3F, 3G, 3H, 3I:
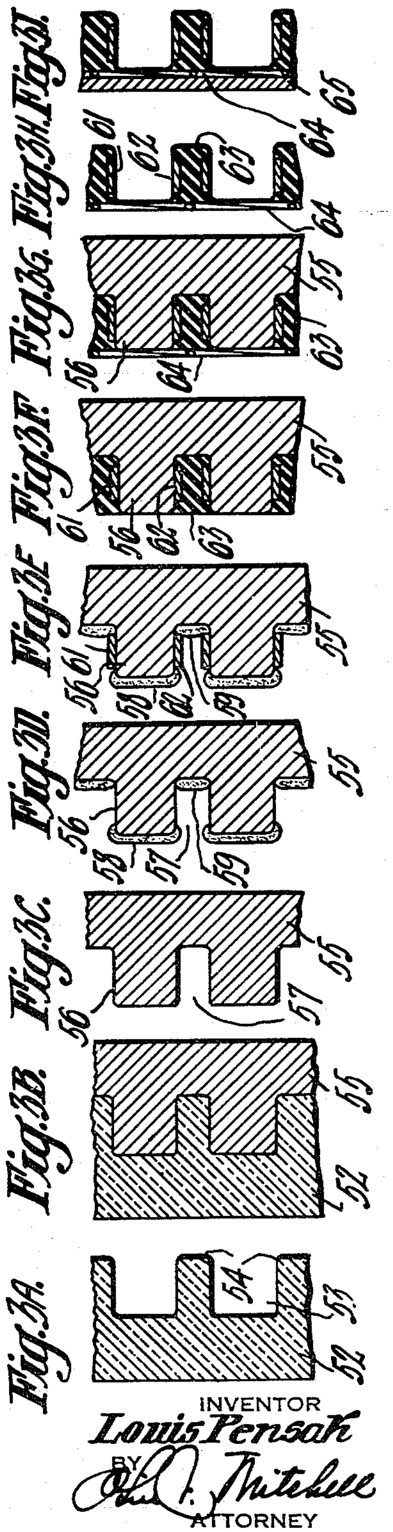

In order to describe a process or method in accordance with this invention for forming a color-selecting electrode such as 25 of Figures 1 and 2, further reference is made to Figures 3A to 3J. In Figure 3A a master plate is constructed to have the form indicated in the figure. Preferably, the master plate is formed by extruding a thermo plastic material through a die having the desired configuration to form the spaced grooves shown in the figure. The master plate 52 is grooved to a depth corresponding substantially to the desired depth of the insulating ribs to be formed and to a width corresponding substantially to the desired separation between adjacent ribs. The master plate, therefore, has alternate grooves such as 53 and ribs such as 54.

The grooved surface of the master plate 52 is then covered with a suitable metallic material such as copper by electroplating, for example, forming a sub-master sheet 55 as shown in Figure 3B.

The sub-master sheet is then stripped away from the master plate and has a form substantially as shown in Figure 3C. It will be noted that the sub-master sheet has a configuration which is complementary to that of the master plate. In other words, there are ridges such as 56 formed in the sub-master plate having the positions and configurations of the grooves such as 53 of the master plate. Likewise, the sub-master plate has slots such as 57 corresponding in position and configuration to the ribs such as 54 of the master plate.

As indicated in Figure 3D, the crests or tops of the sub-master plate ridges such as 56 and the bottoms of the slots such as 57 are masked or coated with a resist or masking material such as lacquer or engraver's enamel as indicated at 58 and 59.

The sub-master plate 55, masked as described, then has a metallic material such as nickel electroplated onto the unmasked or exposed lateral surfaces of the ridges such as 56 as indicated at 61 and 62 in Figure 3E.

The masking material then is removed from the tops of the ridges such as 56 as indicated in Figure 3F by proper application of a solvent for the masking material. For example, where engraver's enamel is used as the resist, it may be removed by daubing the tops of the ridges with a solvent such as ether or acetone. The slots between the metallized ridges such as 56 then are filled with an insulating material such as alumina powder in sodium silicate which can be forced into the slots and cemented to the nickel ribbons such as 61 and 62 and to the rest of the sub-master sheet structure as indicated at 63. Other suitable insulating materials which may be used, particularly where additional rigidity of the final structure is desired, are asbestos or glass fibers.

As indicated in Figure 3G there is then cemented to the tops of the ridges such as 56 of the sub-master sheet 55 a grid network or mesh 64 of suitable metallic material such as nickel to form a cross-connecting structure to fix the spacing of the insulating ribs. The nickel mesh may be cemented to the tops of the ribs by sodium silicate, for example. The entire structure is then subjected to heat, such as by baking, to dry out the cementing materials.

Following this step the copper sub-master sheet is differentially eaten away or etched by the application of a suitable reagent such as nitric acid which will more readily attack the copper than the nickel ribbons such as 61 and 62 and the nickel mesh 64. Following the differential removal of the copper sub-master sheet in the manner described, the remaining structure has the form substantially as shown in Figure 3H. It will be seen that the insulating ribs of the color-selecting electrode are now provided as indicated at 63 and support on their lateral faces the metallic ribbons such as 61 and 62. This structure then is provided with a film of collodion on the mesh 64 to form a base for the secondary electron emitting metallic sheet. The collodion may be applied to the electrode structure by floating a film of collodion on water which may be picked up by the mesh 64.

Finally, the electrode is provided with a sheet of suitable secondary electron emitting material 65 such as aluminum. The aluminum may be applied to the electrode by any suitable means such as by evaporation.

Another embodiment of a color television image reproducing system in which the present invention may be embodied is diagrammatically shown in Figure 4 to which reference now will be made. This system is particularly adapted for use in a television signalling system operating according to the dot or elemental multiplex principle disclosed in a copending U. S. patent application of John Evans, Serial No. 111,384, filed August 20, 1949, and entitled "Color Television." In such a system, each elemental area of the subject is analyzed in succession for the component color content thereof to generate and transmit representative video signals. As in the system shown in Figure 1 the present system employs a composite television signal receiver 11, a synchronizing signal separator 13, a video signal separator 14 and a deflection control circuit 15, together with a cathode ray image reproducing tube 19. In this case, however, the multiplexed video signals derived from the video signal separator 14 are impressed upon respective signal conveying circuits for the different component colors in which the image is to be reproduced. These signal conveying circuits are rendered operative one at a time in a predetermined succession. For this purpose, there is provided a red gating device 66, a blue gating device 67 and a green gating device 68, upon the input circuits of which the video signals derived from the separator 14 are concurrently impressed. The output circuits of gating devices 66, 67 and 68 are coupled respectively to the input circuits of video signal amplifiers 69, 71 and 72 for amplifying respectively the red, blue and green video signals. The output circuits of the video signal amplifiers 69, 71 and 72 are connected respectively to different color-controlling sets of ribbon pairs of the color-selecting electrode 25 substantially in the same manner as this electrode is coupled to the video signal channels 16, 17 and 18 of the system shown in Figure 1.

The video signal gating devices 66, 67 and 68 are controlled by suitable connections to a pulsed oscillator 73 which, in turn, is coupled to the synchronizing signal separator 13 for synchronous control with the video signals being received. The pulses oscillator 73 may be substantially of the same type as that shown in the book entitled "Wave Forms" published by McGraw-Hill Book Co. at page 143, Figs. 4–45. It is essentially a sine wave oscillator susceptible of frequency and phase control by means of impulses impressed thereon and is capable of developing a sinusoidal voltage at a relatively high frequency corresponding to the color change frequency encountered in a television signalling system of the dot or elemental multiplex type.

The output circuit of the pulsed oscillator is coupled to the gating devices 66, 67 and 68 in such a manner that each of these devices is rendered operative once during each cycle of the sinusoidal voltage wave derived from the oscillator and at substantially equally spaced intervals. Accordingly, the oscillator 73 is directly coupled to the red gating device 66. It also is coupled to the blue gating device 67 through a phase-retarding device 74 capable of retarding the phase of the voltage impressed upon the gating device substantially 120 electrical degrees with respect to the voltage impressed upon the red gating device 66. Similarly, the green gating device 68 is coupled to the pulsed oscillator 73 through a 240 electrical degree phase-retarder 75. It will be seen, therefore, that the gating devices 66, 67 and 68 are rendered operative once during each cycle of the sinusoidal voltage derived from the oscillator 73 and at intervals spaced substantially 120 electrical degrees apart.

In view of the foregoing description of the manner in which the system of Figure 1 operates, it is believed that the operation of the embodiment of the invention shown in Figure 4 is fairly obvious. The primary electron beam by which the metallic sheet 26 of the color-selecting electrode 25 is scanned to produce secondary electrons is of constant intensity as in the preceding form of the invention shown and described. The excitation of the discrete phosphor areas of the luminescent screen 33 is varied under the control of the metallic ribbons such as 27—32 in accordance with the respective energiaztion thereof by the red, blue and green video signal amplifiers 69, 71 and 72.

If desired, the system of Figure 4 may be operated entirely in accordance with the elemental multiplex principle so that during the interval that each of the elemental areas of the image is being scanned the respective differently colored light emitting phosphor strips thereof are successively excited. However, by reason of the improved character of the electron-controlling structure of the cathode ray tube 19 in accordance with this invention the different phosphor areas of each elemental area of the luminescent screen 33 may be excited simultaneously. This may be effected quite simply in a manner well known to those skilled in the art by providing the video signal amplifiers 69, 71 and 72 with suitable filtering or smoothing circuits, whereby to effect the development of sustained energizing voltages for the color-selecting electrode 25 instead of the usual pulsating form of energizing voltage conventionally employed in an elemental multiplex color television system. It will be seen that the latter type of operation has the added advantage of producing considerably brighter images by reason of the effective lengthening of the duty cycle of the image reproducing device.

By referring now to Figure 5 of the drawings, a color television image reproducing system embodying this intion operating in accordance with the line or field sequential principle will be described. A composite television signal receiver 76, by means of which wave energy intercepted by the antenna 12 is amplified and finally demodulated to produce the intelligence signals, is coupled to the usual video signal circuits 77 and also to convention deflection control circuits 78. In this case, the video signal circuits 77 are coupled to the intensity control electrode 22 of the cathode ray image reproducing tube 19. This tube is similar to those previously described and includes a luminescent screen 33 and a color-selecting electrode 25.

The deflection control circuits 78 are coupled to a keying frequency oscillator 79 which may be of the same type as the pulsed oscillator 73 of Figure 4. However, in this case, the frequency of the sinusoidal voltage such as represented at 81 derived from the output circuit of the oscillator is somewhat lower than that required of the oscillator 73 of Figure 4. It, however, is similar in that the frequency is substantially equal to the frequency of the color change of the video signals. However, in the present case, the frequency of the oscillator 79 is required to be no greater than the line scanning frequency for use in a line sequential television system and may be as low as the field or frame scanning frequency in a system operating in accordance with the field or frame sequential principle. The output circuit of the keying frequency oscillator 79 is coupled to a keying voltage source 82 which may consist of a plurality of conventional multi-vibrators, for example, one for each of the component colors in which the image is to be reproduced.

In one of the output circuits of the keying voltage source 82, there is produced a voltage having a substantially rectangular waveform such as indicated at 83. Voltages such as represented at 84 and 85 are similarly derived from the other output circuits of the keying voltage source 82. It will be noted that the waveforms of all of these voltages are substantially identical in that they consist of a pulse of unit length or time duration followed by an intervale of twice unit length. The only difference between the voltages 83, 84 and 85 is that they are substantially 120 electrical degrees out of phase with one another. The output circuit of the keying voltage source 82, in which the voltage 83 is developed, is coupled to the set of electron control elements such as 27—28. Similarly, the output circuit, in which the voltage wave 84 is developed, is coupled to the set of electron control elements such as 29—30 and the remaining output circuit, in which the voltage wave 85 is developed, is coupled to the set of electron control elements such as 31—32.

In operation, the system of Figure 5 is somewhat different from the previously described systems in that the primary electron beam is modulated in intensity in occordance with the received video signals. Therefore, the intensity of the secondary electron emission from the screen-facing surface of the metallic sheet 26 is dependent upon the magnitude of the received video signals. The excitation of the different phosphor strips such as 36, 37 and 38 of the luminescent screen 33 is dependent not only upon the intensity of the secondary electrons emitted by the metallic sheet 26 but also the particular strip which is excited is determined by the biasing of the control electrode by means of the pulsating voltages such as represented at 83, 84 and 85. It will be understood that, as in the previously described systems, the primary electron scanning beam has a cross-sectional area sufficient to cause the emission of secondary electrons from an elemental area including at least one sub-elemental portion for each of the colors in which the image is to be reproduced. Consequently, since at any instant the intensity of the primary scanning beam represents the value of only one component color of the image, it is essential only that the proper one of the phosphor screen strips be excited by the secondary electrons produced by the primary beam.

In the case of a system operating according to the line sequential principle, a train of video signals representing a given color component of a complete horizontal line of the image to be reproduced is received. During the reception, and concomitant intensity modulation, of the primary scanning beam by the video signals representing the red color component of a given line of the image, for example, the set of control elements such as 27—28 is biased by means of one of the voltage impulses of the wave 83 to permit the excitation of a red light-emitting phosphor strip such as 36. At this time it will be noted, by comparison of the waveforms 83, 84 and 85, that the other sets of control elements such as 29—30 and 31—32 are sufficiently negatively biased with respect to the metallic sheet 26 to prevent the flow of secondary electrons to the corresponding phosphor strips such as 37 and 38. During the reception of succeeding trains of video signals representing other horizontal lines of the image the electron-controlling elements such as 29—30 and 31—32 are suitably energized to effect the proper excitation of the phosphor strips corresponding to the color represented by the video signals by which the primary scanning beam is modulated.

In the case where the system is operating in accordance with the field or frame sequential principle video signals representing entirely fields or frames of the image to be reproduced are received and employed to modulate the intensity of the primary electron beam. The control biasing of the elements such as 27—32 is effected in substantially the same manner as that described with the exception that the frequency at which the biasing is changed corresponds to the field or frame frequency.

The system of Figure 5 also illustrates one manner in which the present invention may be adapted for use for the selective reproduction of either black and white or colored television images. The three position switch indicated at 86 in the composite television signal receiver 76 is representative of the channel-selecting apparatus of the receiver. For purposes of illustration it is assumed that three channels are available for selection depending upon whether the switch 86 is in position 87, 88 or 89. It will be assumed that the video signals received over channels corresponding to switch positions 87 and 89 are color television video signals and those received over the channel corresponding to switch position 88 are black and white video signals.

There also is provided a selecting switch 91 having three switch arms 92, 93 and 94, each engageable with corresponding ones of three different contacts. The switch arms are connected as shown to the different sets of electron control elements such as 27—32. In the upper and lower positions of the switch arms 92, 93 and 94, connections are made to the respective output circuits of the keying voltage source in which the voltages having waveforms such as represented at 83, 84 and 85 are developed. In the middle position of the switch arms a connection of the electron control electrode is made to a suitable source of positive biasing voltage as shown.

If it is desired to reproduce color television images by means of the video signals receiver over either of the channels corresponding to contact positions 87 and 89 of the channel-selecting switch 86, this switch will be placed in either one of these two positions. By means of a suitable mechanical linkage, indicated at 95, between the channel-selecting switch 86 and the switch 91, the switch arms 92, 93 and 94 are correspondingly positioned either in engagement with their upper or lower contacts. The color television image reproducing system operates substantially in the manner described to reproduce the image substantially in its component colors.

If, however, it is desired to reproduce the video signals received over the channel indicated by the switch position 88, the channel-selecting switch 86 is placed in such position. The switch arms 92, 93 and 94 of the switch 91 are similarly placed in engagement with their respective middle contacts, whereby to impress a fixed positive biasing voltage upon all sets of control elements such as 27—32. It will now be seen that, as the primary electron beam scans the color-selecting electrode to cause the emission of secondary electrons, they will be emitted from all exposed portions of the surface of the metallic sheet 26 facing the luminescent screen 33 in register with elemental areas of the phosphor strips such as 36, 37 and 38. Therefore, all three different light emitting strips of each elemental area of the screen will be simultaneously excited to substantially the same degree. Inasmuch as the embodiment of the invention is for use in an additive color system and the three component colors are properly selected so that when combined they form white light, it will be seen that such operation of the apparatus will produce a television image in black and white light with substantially equal facility as that in which it will reproduce an image in its component colors.

It may be seen from the foregoing description of several embodiments of the invention that there is provided an improved color television system which includes as one of its features a single image reproducing tube which may be satisfactorily employed in any of the presently existing television signalling systems.

Furthermore, by reason of the employment of the improved type of image reproducing tube, in accordance with the invention, it is possible to reproduce an image substantially in its natural component colors at a relatively high light level.

Also, by reason of the use of the improved type of image reproducing tube, it is seen that the light-emitting phosphor areas are excited by secondary electrons which impact the phosphor areas invariably at substantially right angles, irrespective of the angle at which the primary electron beam impinges upon the color selecting target electrode.

In addition, this improved type of image reproducing tube substantially obviates problems of effecting registration between the differently colored phosphor areas and the exciting electrons therefor. This advantage is obtained by a tube of the type described because of the fact that the color-selecting electrode may be properly oriented relative to the luminescent screen while the tube is being constructed so that, subsequently during operation of the tube, accurate registration is effected.

An image reproducing tube of the improved type described, moreover, is susceptible of use in any of the presently existing color television signalling systems. It is apparent also that the available electron beam scanning energy is utilized at all times at a relatively high efficiency.

Another advantage of the improved type of image reproducing device in accordance with the invention is that it is susceptible of use with substantially equal facility in systems for reproducing an image either in its component colors or in a system for reproducing an image in black and white light. Accordingly, a television image reproducing system embodying the present invention may be used for the reception of color television signals over some transmission channels and, by means of a relatively simple switching facility, for the reception of black and white television signals over other channels.

Accordingly, the nature of the invention may be ascertained from the foregoing disclosure of several embodiments and features thereof and its scope may be determined from the following claims.

What is claimed is:

1. A color television image reproducing system, comprising a cathode ray image reproducing tube including a luminescent screen having a plurality of phosphor strips capable respectively of emitting differently colored light when excited by an electron beam, an electrode spaced from said screen capable of emitting electrons when selectively activated, color-selecting electron focussing and control means mounted between said electron emitting electrode and said screen, said electron focussing and control means comprising a plurality of pairs of spaced substantially parallel metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color content, control means for selectively activating in a predetermined pattern successive elemental areas of said electron emitting electrode, means for impressing said received video signals upon one of said control means, and means for impressing a biasing potential upon the other of said control means.

2. A color television image reproducing system, comprising a cathode ray image reproducing tube including a luminescent screen having a plurality of phosphor strips capable respectively of emitting differently colored light when excited by an electron beam, an electrode spaced from said screen capable of emitting electrons when electronically excited, a color-selecting electron focussing and control electrode mounted between said electron emitting electrode and said screen, said electron control electrode comprising a plurality of pairs of spaced substantially parallel metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color content, means including an electron control electrode for electronically exciting in a predetermined pattern successive elemental areas of said electron emitting electrode, means for impressing said received video signals upon one of said electron control electrodes, and means for impressing a biasing potential upon the other of said electron control electrodes.

3. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons when excited by a primary electron beam, a color-selecting secondary electron focussing and control electrode mounted between said secondary electron emitting electrode and said screen, said electron control electrode comprising a plurality of pairs of spaced substantially parallel metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color content, means including an electron gun having an intensity control electrode for scanning in a predetermined pattern successive elemental areas of said secondary electron emitting electrode with a primary electron beam, means for impressing said successively received video signals upon one of said electron control electrodes, and means for impressing a biasing potential upon the other of said electron control electrodes.

4. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons from the side thereof facing said screen when excited by a primary electron beam, a color-selecting secondary electron focussing and control structure mounted between said secondary electron emitting electrode and said screen, said electron control structure comprising a plurality of pairs of spaced substantially parallel metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color content, means for scanning in a predetermined pattern successive elemental areas of said secondary electron emitting electrode with a primary electron beam of constant intensity, and means for impressing said received video signals upon said respective electron focussing and control networks corresponding to the component image colors represented by the video signals to selectively control the secondary electron emission of said electrode.

5. A color television image reproducing system, comprising a cathode ray image reproducing tube including a luminescent screen having a plurality of phosphor strips of sub-elemental width capable respectively of emitting differently colored light when excited by an electron beam, an electrode spaced from said screen capable of emitting secondary electrons from the side thereof facing said screen when impinged by a primary electron beam on the opposite side thereof, a color-selecting secondary electron focussing and control structure mounted between said secondary electron emitting electrode and said screen, said electron control structure comprising a plurality of pairs of spaced substantially parallel metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color content, means for scanning in a predetermined pattern successive elemental areas of said secondary electron emitting electrode on the side thereof remote from said luminescent screen with a primary electron beam of constant intensity, means for impressing said received video signals upon said respective electron control networks corresponding to the component image colors represented by the video signals to selectively control the secondary electron emission of said electrode, and means including said electron control structure for focussing said secondary electrons onto the respective phosphor strips of said screen with which said pairs of ribbons are registered.

6. A color television image reproducing system, comprising a cathode ray image reproducing tube having a luminescent screen consisting of a thin transparent metallic film and in contact therewith a plurality of phosphor strips of subelemental width capable respectively of emitting differently colored light when excited by an electron beam, an electrode spaced from said screen capable of emitting secondary electrons from the side thereof facing said screen when impinged by a primary electron beam on the opposite side thereof, a color-selecting secondary electron focussing and control electrode structure mounted between said secondary electron emitting electrode and said screen, said electron control electrode structure comprising a plurality of pairs of spaced metallic ribbons laterally directed toward said screen, each pair of said ribbons registering substantially with one of said phosphor strips and all of said pairs of ribbons which register with phosphor strips of a particular color being electrically connected together to form an electron control network for each of the component colors in which said image is to be reproduced, means for receiving video signals representative respectively of said component image color control, means for scanning in a predetermined pattern successive elemental areas of said secondary electron emitting electrode on the sides thereof remote from said luminescent screen with a primary electron beam of constant intensity, means for impressing said received video signals upon said respective electron control networks corresponding to the component image colors represented by the video signals to selectively control the secondary electron emission of said electrode, means for impressing a secondary electron accelerating potential between said metallic screen film and said secondary electron emitting electrode, and means including said electron control electrode structure for focussing said secondary electron onto the respective phosphor strips of said screen with which said pairs of grid strips are registered.

7. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons when excited by a primary electron beam, a color-selecting secondary electron focussing and control structure mounted between said secondary electron emitting electrode and said screen, said electron control structure comprising a plurality of pairs of spaced metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving simultaneously video signals representative respectively of said component image color content, means for scanning in a predetermined pattern successsive elemental areas of said secondary electron emitting electrode with a primary electron beam of constant intensity, and means for impressing said received video signals substatnially simultaneously upon said respective electron focussing and control networks corresponding to the component image colors represented by the video signals to selectively control the secondary electron emission of said electrode.

8. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons when excited by a primary electron beam, a color-selecting secondary electron focussing and control structure mounted between said secondary electron emitting electrode and said screen, said electron control structure comprising a plurality of pairs of spaced metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving successively video signals representative respectively of said component image color content, means for scanning in a predetermined pattern successive elemental areas of said secondary electron emitting electrode with a primary electron beam of constant intensity, and means for impressing said received video signals successively upon said respective electron focussing and control networks corresponding to the component image colors represented by the video signals to selectively control the secondary electron emission of said electrode.

9. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons when excited by a primary electron beam, a secondary electron focussing and control structure mounted between said secondary electron emitting electrode and said screen, said electron control structure comprising a plurality of pairs of spaced metallic ribbons, each pair of said ribbons registering substantially with one of said phosphor strips and all of said pairs of ribbons which register with phosphor strips of a particular color being electrically connected together to form a secondary electron control network, means for receiving successively video signals representative of the light values of the image to be reproduced, means for scanning in a predetermined pattern successive elemental areas of said secondary electron emitting electrode with a primary electron beam, means for modulating the intensity of said primary electron beam in accordance with said successively received video signals, and means for impressing energizing potentials upon said electron focussing and control networks to excite said phosphor screen strips.

10. A color television image reproducing system, comprising a cathode ray image reproducing tube including a luminescent screen having a plurality of phosphor strips capable respectively of emitting differently colored light when excited by an electron beam, an electrode spaced from said screen capable of emitting secondary electrons when excited by a primary electron beam, a color-selecting secondary electron focussing and control structure mounted between said secondary electron emitting electrode and said screen, said electron control structure comprising a plurality of pairs of spaced metallic ribbons, each pair of said ribbons registering substantially with one of said phosphor strips and all of said pairs of ribbons which register with phosphor strips of a particular color being electrically connected together to form an electron control network for each of the component colors in which said image is to be reproduced, means for receiving successively video signals representative respectively of said component image color content, means for scanning in a predetermined pattern successive elemental areas of said secondary electron emitting electrode with a primary electron beam, means for modulating the intensity of said primary electron beam in accordance with said successively received video signals, and means for impressing varying energizing potentials upon said electron focussing and control networks in substantial coincidence with the color changes of said received video signals to selectively excite said respective phosphor screen strips corresponding to the component image colors represented by the video signals.

11. A cathode ray tube for reproducing a colored television image, comprising a luminescent screen formed of a plurality of discrete phosphor areas capable respectively of emitting light of the different component colors of the image to be reproduced when excited by an electron beam, said phosphor areas being arranged in groups and each group including at least one strip of each color-emitting phosphor, an electrode mounted in spaced relation to said screen and capable of emitting electrons from elemental portions thereof when selectively activated, a color-selecting electron focussing and control structure disposed between said electrode and said screen and comprising a pair of metallic plates in substantial register with each of said phosphor areas and energizable to focus the electron emission by said electrode for variable excitation of its associated phosphor area, and means for selectively activating different elemental portions of said electrode according to a predetermined pattern.

12. A cathode ray tube for reproducing a colored television image, comprising a luminescent screen formed of a plurality of discrete phosphor areas capable respectively of emitting light of the different component colors of the image to be reproduced when excited by an electron beam, said phosphor areas being arranged in groups and each group including at least one area of each color-emitting phosphor, a planar electrode mounted in spaced relation to said screen and capable of emitting electrons from portions of the surface thereof facing said screen when selectively activated, a color-selecting electron focussing and intensity control grid structure mounted between said planar electrode and said screen and comprising a pair of metallic plates in register with each of said phosphor areas and variably energizable to control the electron emission by said planar electrode and to direct said electron emission for variable excitation of its associated phosphor area, and means located on the side of said planar electrode remote from said screen for selectively activating different areas of said planar electrode in a predetermined pattern.

13. A cathode ray tube for reproducing a colored television image, comprising a luminescent screen formed of a plurality of strips of phosphors capable respectively of emitting light of the different component colors of the image to be reproduced when excited by an electron beam, said phosphor strips being arranged in groups and each group including at least one strip of each color-emitting phosphor, a metallic sheet mounted in spaced relation to said screen and capable of emitting secondary electrons from portions of the surface thereof facing said screen when corresponding portions of the opposite surface thereof are electronically excited, a color-selecting electron focussing and intensity control grid structure mounted between said metallic sheet and said screen and comprising a pair of spaced metallic ribbons in register with each of said phosphor strips and variably energizable to control the intensity of the secondary-electron emission by said metallic sheet and to concentrate said electron emission for variable excitation of its associated phosphor strips, and means located on the side of said metallic sheet remote from said screen for electronically exciting said sheet in a predetermined pattern.

14. A cathode ray tube for reproducing a colored television image, comprising a luminescent screen formed of a transparent metallic film supporting a plurality of strips of phosphors capable respectively of emitting light of the different component colors of the image to be reproduced when excited by an electron beam, said phosphor strips being arranged in groups having widths conforming substantially with the corresponding dimension of an elemental image area and each group including at least one strip of each color-emitting phosphor, a metallic sheet mounted in spaced relation to said screen and capable of emitting secondary electrons from portions of the surface thereof facing said screen when corresponding portions of the opposite surface thereof are excited by a beam of primary electrons, a color-selecting electron focussing and intensity control grid structure mounted between said metallic sheet and said screen and comprising a pair of electrically connected spaced metallic ribbons in register with each of said phosphor strips and energizable to control the intensity of the secondary electron emission by said metallic sheet and the focussing of said secondary electrons upon its associated phosphor strip, and means located on the side of said metallic sheet remote from said screen for generating and deflecting a primary beam of electrons over said sheet in a predetermined scanning pattern.

15. A cathode ray tube for reproducing a colored television image, comprising a luminescent screen formed of a thin transparent metallic film and in contact therewith a multiplicity of horizontally extending strips of phosphors capable respectively of emitting light of the different component colors of the image to be reproduced when excited by an electron beam, said phosphor strips being arranged in groups having widths no greater than the corresponding dimension of an elemental image area and each group including at least one strip of each color-emitting phosphor, a thin metallic sheet mounted in spaced, substantially parallel relation to said screen and capable of emitting secondary electrons from portions of the surface thereof facing said screen when corresponding portions of the opposite surface thereof are impinged by a beam of primary electrons, a color-selecting electron focussing and intensity control electrode structure mounted between said metallic sheet and said screen and comprising a pair of horizontally extending electrically connected spaced metallic ribbons in register with each of said phosphor strips and energizable to control the intensity of the secondary electron emission by said metallic sheet and the focussing of said secondary electrons upon its associated phosphor strip, and means located on the side of said metallic sheet remote from said screen for generating and deflecting a primary beam of electrons over said sheet in a predetermined scanning pattern.

16. A color-kinescope comprising an evacuated envelope containing a luminescent screen having an electron-sensitive light-emissive surface consisting essentially of a multiplicity of sub-elemental phosphor-covered areas each capable of emitting light of a color individual to that area in response to the impact of electrons thereon, an electron-emissive electrode having an area corresponding substantially to that of said light-emissive surface and mounted in spaced relation with respect to said surface, and a multiplicity of pairs of spaced-apart control electrodes mounted in the space between said electron-emissive electrode and said light-emissive surface, the control electrodes comprising a given pair being individual to one of said sub-elemental color-emissive phosphor areas.

17. The invention as set forth in claim 16 and wherein the number of pairs of control electrodes is equal to the number of said sub-elemental color-emissive phosphor areas.

18. A color-kinescope in accordance with claim 17 and wherein the individual ones of a given pair of control electrodes are connected within said evacuated envelope to the respective ones of another of said pairs of control electrodes, said connected pairs of control electrodes being individual to different ones of said groups of sub-elemental color-emissive phosphor areas.

19. The invention as set forth in claim 18 and wherein the individual electrodes comprising the pair of control electrodes which are allotted to a particular one of the color-phosphor areas in a given group are connected to individual ones of the pairs of control electrodes which are allotted to the corresponding color-phosphor in each of the others of said groups.

20. The invention as set forth in claim 19 and wherein the individual ones of a given pair of control electrodes are disposed about an electron-optical axis which extends between said electron-emissive electrode and the sub-elemental color-emissive phosphor area to which said given pair of control electrodes is allotted.

21. The invention as set forth in claim 20 and wherein the electron-optical axis about which said individual control electrodes are disposed intersects said color-emissive phosphor area substantially at a right angle.

22. A color kinescope comprising, an evacuated envelope containing a thin metallic target having an obverse face adapted to release secondary electrons in response to the impact of primary electrons upon the reverse face thereof, an electron gun mounted in a position to bombard said reverse face of said target with primary electrons, a luminescent screen having an electron-sensitive light-emissive surface presented across an intervening space to said obverse face of said target, said light-emissive surface consisting essentially of a multiplicity of groups of sub-elemental phosphor-covered areas, each capable of emitting light of a color individual to that area in response to the impact thereon of secondary electrons from said target electrode, and a multiplicity of pairs of spaced-apart control electrodes for said secondary electrons mounted in the space between said target and screen, the control electrodes comprising a given pair being individual to one of said sub-elemental color-emissive phosphor areas.

23. The invention as set forth in claim 22 and wherein said obverse face of said metallic target is provided with a multiplicity of insulating protuberances upon which individual ones of said control electrodes are supported.

24. The invention as set forth in claim 23 and wherein individual ones of said insulating protuberances comprise a support for one electrode of one pair and another electrode of another pair.

25. The invention as set forth in claim 22 and wherein the sub-elemental phosphor-covered areas comprising a given group comprise a plurality of parallelly disposed ribbon-like areas.

26. In a cathode ray tube for reproducing a colored television image and including a luminescent screen having a multiplicity of phosphor areas of sub-elemental dimensions and capable of emitting differently colored light when excited by an electron beam, a color-selecting electrode, comprising a sheet of material capable of emitting electrons from portions of the surface thereof facing said screen when locally activated, and a plurality of insulating ribs disposed in proximity to the surface of said sheet facing said screen and having the opposing lateral surfaces thereof metallized to serve as electron control elements.

27. In a cathode ray tube for reproducing a colored television image and including a luminescent screen having a multiplicity of phosphor areas of sub-elemental dimensions and capable of emitting differently colored light when excited by an electron beam, a color-selecting electrode, comprising a sheet of material capable of emitting electrons from the surface thereof facing said screen when electronically excited, a plurality of separate insulating ribs mounted adjacent to the surface of said sheet facing said screen, and metallic ribbons formed on opposing lateral surfaces of said insulating ribs and serving as electron control elements.

28. In a cathode ray tube for reproducing a colored television image and including a luminescent screen having a multiplicity of phosphor areas of sub-elemental dimensions and capable of emitting differently colored light when excited by an electron beam, a color-selecting electrode, comprising a metallic sheet capable of emitting secondary electrons from selected portions of the surface thereof facing said screen when corresponding portions of the opposite surface thereof are excited by primary electrons, a plurality of spaced insulating ribs formed on the surface of said metallic sheet facing said screen, and metallic ribbons formed on opposite sides of said insulating ribs and serving as secondary electron control elements.

29. In a cathode ray tube for reproducing a colored television image and including a luminescent screen having a multiplicity of phosphor areas of sub-elemental dimensions and capable of emitting differently colored light when excited by an electron beam, a color-selecting electrode, comprising a metallic sheet capable of emitting secondary electrons from selected elemental portions of the surface thereof facing said screen when the opposite surface thereof is impinged by a primary electron beam, a plurality of spaced insulating ribs formed on the surface of said metallic sheet facing said screen, and metallic ribbons formed on opposite sides of said insulating ribs and serving as secondary electron intensity control and focussing elements.

30. In a cathode ray tube for reproducing a colored television image and including a luminescent screen having a multiplicity of phosphor areas of sub-elemental dimensions and capable of emitting differently colored light when excited by an electron beam, a color-selecting electrode comprising a thin metallic sheet capable of emitting secondary electrons from the surface thereof facing said screen when the opposite surface thereof is impinged by a primary electron beam, a plurality of insulating strips formed on the surface of said metallic sheet facing said screen, and metallic ribbons formed on opposite sides of said insulating strips and serving as secondary electron intensity control and focussing elements.

31. A dynode comprising a thin metallic sheet having an obverse face capable of releasing secondary electrons in response to the impact of primary electrons upon the reverse surface thereof, a multiplicity of insulating protuberances on said obverse face, said insulating protuberances comprising a multiplicity of spaced-apart parallelly disposed ribs, and a plurality of discrete conductive film-like electrodes adhered to the opposed parallel faces of the spaced-apart ribs comprising said insulating protuberances.

References Cited in the file of this patent

UNITED STATES PATENTS

| | | |
|---|---|---|
| 2,193,101 | Knoll | Mar. 12, 1940 |
| 2,343,825 | Wilson | Mar. 7, 1944 |
| 2,446,791 | Schroeder | Aug. 10, 1948 |
| 2,529,485 | Chew | Nov. 14, 1950 |
| 2,530,842 | Ruggieri | Nov. 21, 1950 |
| 2,579,665 | Green | Dec. 25, 1951 |
| 2,580,250 | Smith | Dec. 25, 1951 |
| 2,584,814 | Rosenberg | Feb. 5, 1952 |